US007274761B2

(12) United States Patent
Muller et al.

(10) Patent No.: US 7,274,761 B2
(45) Date of Patent: Sep. 25, 2007

(54) DEVICE SYNCHRONISATION OVER A NETWORK

(75) Inventors: Thomas Muller, Bochum (DE); Olaf Joeressen, Meerbusch (DE); Jurgen Schnitzler, Bochum (DE); Markus Schetelig, Waltrop (DE)

(73) Assignee: Nokia Corporation, Espo (FI)

( * ) Notice: Subject to any disclaimer, the term of this patent is extended or adjusted under 35 U.S.C. 154(b) by 1067 days.

(21) Appl. No.: 09/885,130

(22) Filed: Jun. 21, 2001

(65) Prior Publication Data

US 2002/0031196 A1      Mar. 14, 2002

(30) Foreign Application Priority Data

Jun. 27, 2000  (GB) .................................. 0015721.4

(51) Int. Cl.
 *H04L 7/00* (2006.01)
(52) U.S. Cl. ........................ 375/354; 375/356; 370/503
(58) Field of Classification Search ................ 370/328, 370/349, 330, 458, 503; 455/426, 414, 445, 455/552, 434, 464, 452, 41, 553.1, 41.2–41.3, 455/11.1, 557, 556.1; 375/133, 132, 131, 375/138, 219, 356, 354
See application file for complete search history.

(56) References Cited

U.S. PATENT DOCUMENTS

| | | | |
|---|---|---|---|
| 4,530,091 A | | 7/1985 | Crockett |
| 5,715,438 A | * | 2/1998 | Silha .......................... 713/400 |
| 5,818,847 A | * | 10/1998 | Zak ............................ 714/704 |
| 5,883,956 A | * | 3/1999 | Le et al. ...................... 713/170 |
| 6,026,297 A | * | 2/2000 | Haartsen ................... 455/426.1 |
| 6,278,723 B1 | * | 8/2001 | Meihofer et al. ........... 375/133 |
| 6,347,084 B1 | * | 2/2002 | Hulyalkar et al. .......... 370/347 |
| 6,519,460 B1 | * | 2/2003 | Haartsen ................... 455/452.1 |
| 6,574,266 B1 | * | 6/2003 | Haartsen ..................... 375/133 |
| 6,683,886 B1 | * | 1/2004 | van der Tuijn et al. ..... 370/458 |
| 6,697,638 B1 | * | 2/2004 | Larsson et al. ........... 455/553.1 |

(Continued)

FOREIGN PATENT DOCUMENTS

GB        2 278 519 A        11/1984

(Continued)

OTHER PUBLICATIONS

Bluetooth TM: a new radio interface providing ubiquitous connectivity□□Haartsen, J.C.;□□Vehicular Technology Conference Proceedings, 2000. VTC 2000-Spring Tokyo. 2000 IEEE 51st , vol. 1 , May 15-18, 2000 □□pp. 107-111 vol. 1□□.*

(Continued)

*Primary Examiner*—Temesghen Ghebretinsae
(74) *Attorney, Agent, or Firm*—Banner & Witcoff, Ltd.

(57) ABSTRACT

A transceiver for operating in a network wherein the transceiver is arranged to synchronize to a time reference common to the network having distinguishable instances, the transceiver containing a controller for effecting the reading or writing of a real time clock at an identified instance of the common time reference; a transmitter for transmitting an identification of the real time clock value of a first instance and an identification of the first instance, and a receiver for receiving a transmitted identification of a real time clock value and an identification of a first instance.

68 Claims, 6 Drawing Sheets

U.S. PATENT DOCUMENTS 6,788,656 B1 * 9/2004 Smolentzov et al. ....... 370/328
6,816,510 B1 * 11/2004 Banerjee ..................... 370/503

FOREIGN PATENT DOCUMENTS

| GB | 2278519 A | * 11/1994 |
| WO | 0038361 | 6/2000 |
| WO | WO/38361 | 6/2000 |

OTHER PUBLICATIONS

Kardach, James; Bluetooth Architecture Overview; Intel Technology Journal Q2, 2000.*

Development of the Bluetooth version 1.0 specification; Camp, M.T.; Emerging Technologies Symposium: Broadband, Wireless Internet Access, 2000 IEEE Apr. 10-11, 2000 pp. 7 pp.*

The Bluetooth radio system; Haartsen, J.C.; Personal Communications, IEEE [see also IEEE Wireless Communications] vol. 7, Issue 1, Feb. 2000 pp. 28-36.*

Specification of the Bluetooth System; Version 1.0 B Dec. 1, 1999 Sections 9 and 10, pp. 87-93, 95-97.*

PTO International Search Report, International Application No. PCT/EP 01/06675; date of search Oct. 12, 2001.

* cited by examiner

DEVICE SYNCHRONISATION OVER A NETWORK

BACKGROUND OF THE INVENTION

The present invention relates to the synchronisation of Real Time clocks of separate devices. It has particular application for devices communicating according to the Bluetooth Standard.

In an increasingly multimedia world, it is important to be able to control the timing of multimedia output so that each of the outputs have the correct timing relative to other events and outputs. If the correct timing is achieved each output will be in real time and will be correctly synchronised with the other outputs.

If the outputs are distributed in space, however, it may be difficult to establish and maintain synchronicity between the real time clocks associated with each output.

This problem is particularly acute when the latencies between the different outputs are unknown or variable.

This problem applies equally to multimedia inputs and maintaining the synchronism between them.

An exemplary scenario in which the problem comes to the fore is in a surround sound video application in which multiple audio outputs are synchronised to the video output. During recording and playback the different media streams (audio and video) need to be adjusted with respect to a certain time reference.

It would be desirable to address the above mentioned problem of synchronisation.

SUMMARY OF THE INVENTION

According to one aspect of the present invention, there is provided a transmitter for transmitting in a network comprising the transmitter and at least one receiver, wherein the transmitter is arranged to synchronise to a common time reference having distinguishable instances, comprising: means for reading a real time clock at an identified instance of the common time reference; and means for transmitting an identification of the real time clock value for a first instance and an identification of the first instance.

The first instance may be in the past or may be in the future at the moment of transmission. The transmitter may calculate the real time clock value at the first instance by adding the time difference between the first instance and the identified instance to the real time clock value at the identified instance to obtain the real time clock value for the first instance. However, the first instance and the identified instance may be one and the same, in which case such calculation is unnecessary.

According to another aspect of the invention, there is provided a receiver for receiving in a network comprising at least the receiver and a transmitter, wherein the receiver is arranged to synchronise to a common time reference having distinguishable instances, comprising: means for receiving a transmitted identification of a real time clock value and an identification of a first instance; and means for determining a real time clock value, current at a second instance from the received identification of a real time clock value and the received identification of a first instance.

The real time clock value is the received value, if necessary, corrected in accordance with the time difference between the first and second instances.

The first instance may be in the past at the moment of reception. The real time clock value determination may be by calculation in which the time difference between the second and first instances is added to the received value of the real time clock.

The first instance may be in the future at the moment of reception. The means for determining may determine that the current real time clock value is the received value when the second instance of the common time reference occurs, the second and first instances being one and the same.

The transmitter may be a part of a transceiver and the receiver may be a part of a transceiver.

The transmitter and receiver may together form a transceiver.

According to other aspects of the invention, there are provided transceivers methods and a network.

The problem addressed may be exacerbated when the inputs or outputs are not physically connected but communicate wirelessly. The limitations on available bandwidth may cause problems in real time communication.

According to a preferred embodiment of the present invention, the wireless communication is provided in accordance with the Bluetooth Standard, adapted to incorporate the present invention. In this preferred embodiment, existing aspects of the existing Bluetooth system are ingeniously re-used. In particular the Link Level Synchronisation which is used for the timing of Fast Frequency Hopping is used as the common time reference of the present invention. This advantageously provides Real Time synchronism between devices in the range of a few microseconds. Furthermore, Link Level Messages may be used to communicate the necessary identifications of the real time value and the first instance.

In embodiments of the invention, the synchronous instances of the common time reference are such that when there is an instance in one device there is an identifiably corresponding instance in an other device. Preferably, the instances are separated by a fixed time period or an integral number of fixed time periods.

BRIEF DESCRIPTION OF THE DRAWINGS

For a better understanding of the present invention, and to understand how the same may be brought into effect, reference will now be made by way of example only to the following drawings, in which.

DETAILED DESCRIPTION OF THE INVENTION

Figure 1:
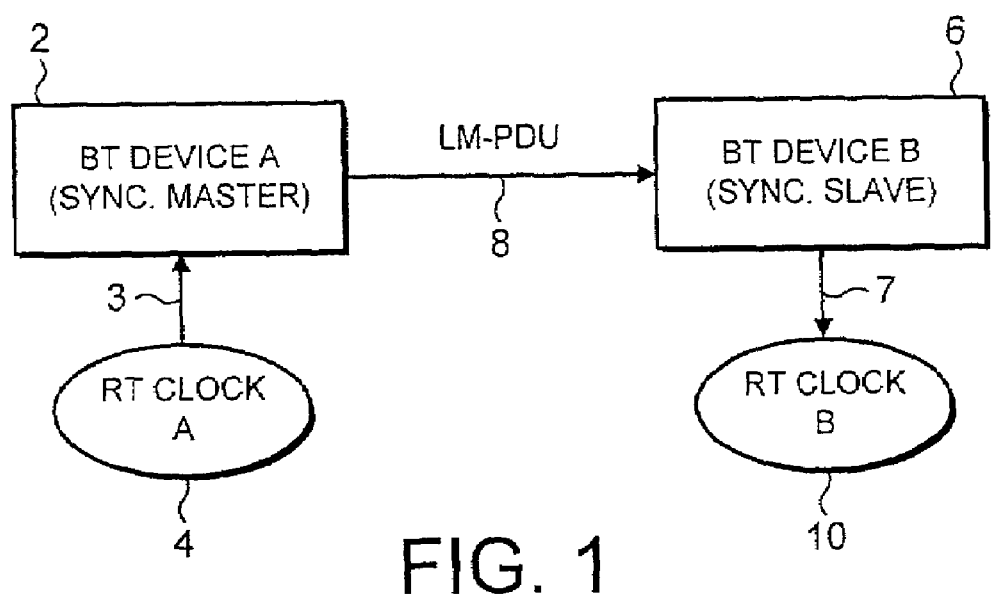
FIG. 1 is a schematic illustration of a transmitter and a receiver each of which performs aspects of the present invention.

Referring to FIG. 1, there is illustrated a transmitter device 2 having access 3 to a Real Time (RT) Clock 4, and a receiver device 6. The transmitter 2 communicates with the receiver via a communication channel 8, which may for example be a radio channel. The receiver may have access 7 to a RT Clock 10.

The transmitter is able to provide information to the receiver, via channel 8 that allows the receiver 6 at some future time to have a RT value which is synchronous with the value of the RT Clock 4. The receiver may update RT clock 10, accordingly.

Figure 2:
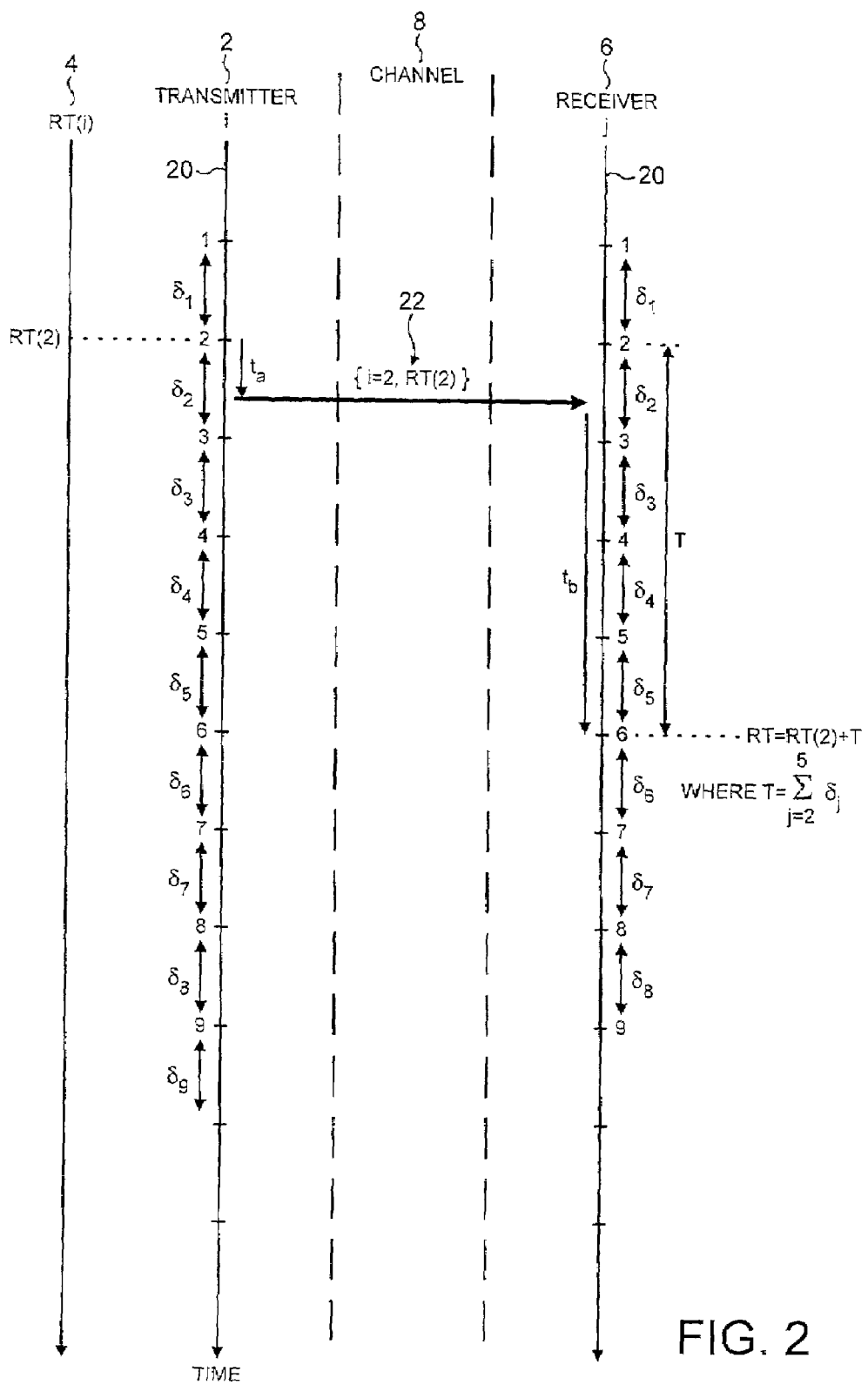
FIG. 2 is a schematic illustration of the common time reference, the communication between transmitter and receiver and the calculations performed at the receiver according to a first embodiment of the invention.
Figure 3:
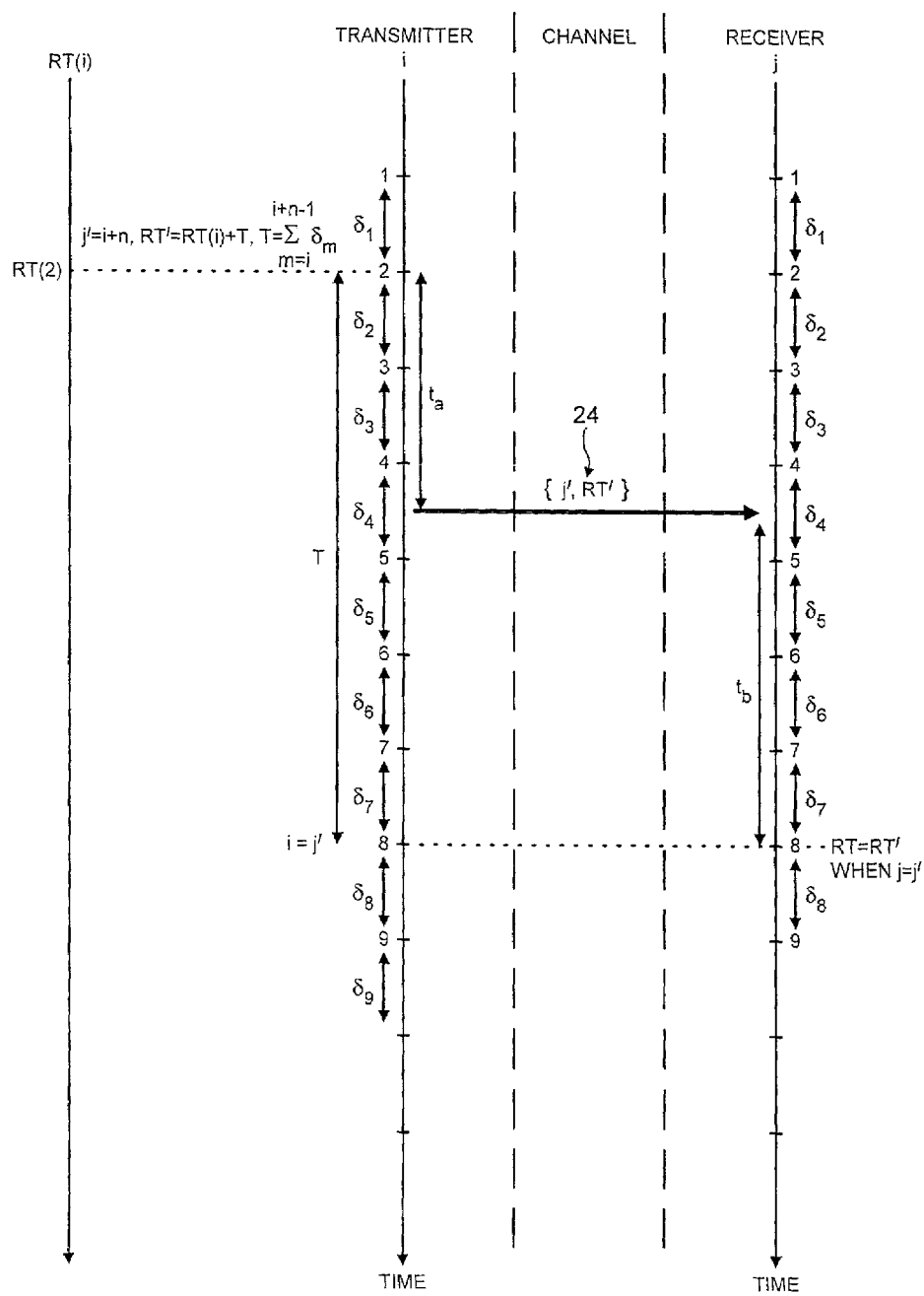
FIG. 3 is a schematic illustration of the common time reference, the calculation performed in the transmitter and the communication between the transmitter and receiver according to a second embodiment of the invention.

The transmitter 2 and receiver 6 share a common time reference. The time reference is typically a clock which produces a plurality of beats or instances, such as a rising (or falling) voltage, each of which is separated by a time interval. The common time reference 20 is illustrated in FIGS. 2 and 3. The RT clock 4 and common time reference 20 of the transmitter are illustrated to the left of the figures, the common time reference 20 of the receiver is illustrated to the right of the Figures and the channel 8 is illustrated in the middle of the Figures. The arrow of time extends down the page. The common time reference 20 in the transmitter illustratively uses an index i $\{i=1, 2, 3 \ldots \}$ to represent the successive instances of the common time reference. The common time reference 20 in the receiver illustratively uses an index j $\{j=1, 2, 3 \ldots \}$ to represent the successive instances of the common time reference. It should be noticed that the instances i of the transmitter and the instances j of the receiver are synchronous because when an instance i occurs in the transmitter an instance j simultaneously occurs in the receiver.

The interval between instance i and instance i+1, $\delta_i$, and the interval between instance j and instance j+1, $\delta_j$, are the same when instance i and j are synchronous for all i and j. The intervals may be the same duration irrespective of i and j or the interval $\delta_i$ may differ from the interval $\delta_{i+1}$.

Not only are there synchronous instances in the transmitter and receiver, but a particular instance i in the transmitter will be synchronous with a particular instance j in the receiver. Therefore, an instance in the transmitter can be identified by a value for i of x and a corresponding synchronous instance j in the transmitter can be identified as the instance when j=x. The instances of the common time reference which occur in the transmitter are therefore distinguishable, in this example by the index i. The instances of the common time reference which occur in the receiver are therefore distinguishable, in this example by the index j.

The operation of the transmitter and receiver according to a first embodiment will now be explained with reference to FIG. 2. At an instance i=2, the transmitter 2 reads the current settings RT(2) of the RT clock 4. At a later time (latency of $t_a$), the transmitter sends a message 22 to the receiver. The message indicates the instant i=2 when the RT clock was read and indicates the read value RT(2) of the RT clock. The receiver 6 receives the message 22 and identifies the value RT(2) and the value i=2. The receiver, synchronous with an instance j=6 of the common time frame, determines the current Real Time Clock value RT. There is a latency of $t_b$ between the receipt of the message 22 and the determination of the current Real Time Clock value RT. The receiver calculates the time difference T between the instance at which RT(2) was read (i=j=2) and the current instance (j=6) and adds it to the received value of the Real Time clock (RT(2)). To calculate T, the receiver identifies the prior instance of the common time reference in the receiver which corresponds to the identified instance i=2 of the common time frame of the transmitter. The receiver sums the known interceding interval(s) to calculate T.

The operation of the transmitter and receiver according to a second embodiment will now be explained with reference to FIG. 3. At an instant i=2, the transmitter 2 reads the current settings RT(2) of the RT clock 4. The transceiver determines what the Real Time value RT' will be at a future instance j' of the common time frame. The transmitter calculates the time difference T between the instance at which RT(2) was read (i=2) and the future instance j' and adds it to the value of the Real Time clock (RT(2)). To calculate T, the transmitter sums the known interval(s) between i=2 and i=j'. At a later time (latency of $t_a$) the transmitter sends a message 24 to the receiver.

The message indicates the instant j' and the value RT'. The receiver 6 receives the message 24 and identifies the value RT' and the value j'. At an instance j of the common time reference of the receiver corresponding to the instance j', the current Real Time Clock value RT is RT'.

The latencies $t_a$ and $t_b$ are generally unknown and variable.

Generalising, let k, l, and m be instances of the common reference 20. At the transmitter, a real time value RT(k) is read at instant k and a message is sent which identifies an instant/and a real time value RT(l) at that instant, where instant/is synchronous with or after instant k. At the receiver, at an instant m, the current real time value RT(m) is set to $RT(l)+T_{lm}$, where $T_{lm}$ is the interval between instant m and l.

The system as described is particularly useful for distributed devices or application which require synchronicity in real time such as multimedia applications. The transmitter 2 may be part of a multimedia input such as a camera or speaker or local distribution point such as a satellite receiver. The receiver 6 may be part of a multimedia output device such as a speaker or screen.

The transmitter may send audio, video or data to the receiver, together with a Real Time stamp. The transmitter produces an output at the correct time using its own correct Real Time clock and the time stamp. The above mentioned procedure creates and maintains synchronicity between the Real Time clock associated with the transmitter 2 and the Real Time clock associated with the receiver 6.

Embodiments of the invention find particular application in transmitters, receivers and transceivers operating in accordance with the Bluetooth specification as described below. The current specification is 1.0B, the contents of which are hereby included by reference.

Figure 4:
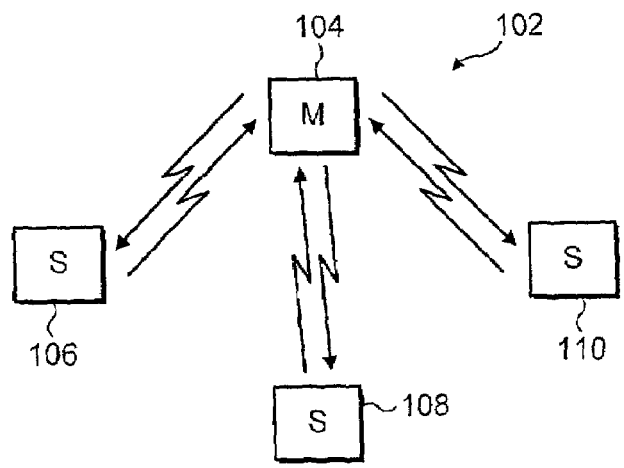
FIG. 4 illustrates a Bluetooth communications network.

FIG. 4 illustrates a network 102 of radio transceiver units, including a master unit 104 and slave units 106, 108 and 110, communicating by transmitting and receiving radio packets. The master unit is the transceiver unit which initiates the connection of a slave to the network. There is only one master in a network. The network operates in a time division duplex fashion. A single packet is transmitted in the network at a time and the transceiver units are synchronised to a common time frame determined by the master unit 104. This time frame consists of a series of time slots of equal length. Normally, each radio packet transmitted in the network has its start aligned with the start of a slot and adjacent slots are assigned for respectively transmission and reception by the master unit. When the master unit is performing point-to-point communication, a transmitted radio packet is addressed to a particular transceiver which replies to the master unit by transmitting a radio packet addressed to the master unit in the next available time slot. When the master unit is performing point to multi-point communication, a transmitted radio packet is addressed to all transceiver units. Any time misalignment between the master and a slave is corrected by adjusting the timing of the slave.

The transceivers transmit and receive in a microwave frequency band, typically 2.4 GHz.

The network reduces interference by changing the frequency at which each radio packet is transmitted. A number of separate frequency channels are assigned each with a bandwidth of 1 MHz, and the frequency hops at a rate of 1600 hops/s. The frequency hopping of the transceivers communicating in or joining the network is synchronised and controlled by the master unit. The sequence of hopping frequencies is unique for the network and is determined by a unique identification of the master unit. Each transceiver unit has a unique identification, the Unit ID, henceforth referred to as the Slave ID for the slave units and the Master ID for a master unit.

The network is a radio frequency network suitable for transmitting voice information or data information between transceivers. The transmissions made are of low power, for example 0 to 20 dBm, and the transceiver units can effectively communicate over the range of a few centimeters to a few tens or hundred of meters. The master unit has the burden of identifying the other transceiver units within its transmission range and the burden of paging a transceiver unit to set up a communication link between the master unit and that slave unit. Each of the slave units has a low power mode in which it neither transmits nor receives and other modes in which it receives and then responds to radio packets addressed to it by the master unit. A slave unit may remain in the low power mode except when transmitting or receiving.

Figure 5:
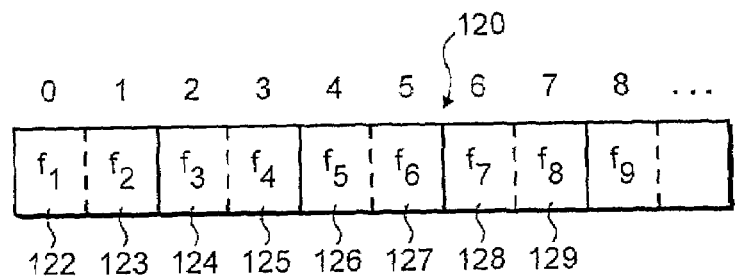
FIG. 5 illustrates the time frame of the communications network.

Referring to FIG. 5, a frame 120 is illustrated. This frame 120 is the common time frame used by the network 102 and controlled by the master unit 104. The frame illustratively has slots 122 to 129. The slots designated by even numbers are normally reserved. Only the master unit can normally begin transmitting a radio packet aligned with the start of the even numbered slots. The slots designated by odd numbers are normally reserved. Only radio packets transmitted by a slave, that is radio packets addressed for reception by the master unit can normally have their start aligned with the start of the odd numbered slots. Each slot is allocated a different one of a sequence of hopping frequencies. A slot has a constant time period and is typically 625 microseconds.

Figure 6:
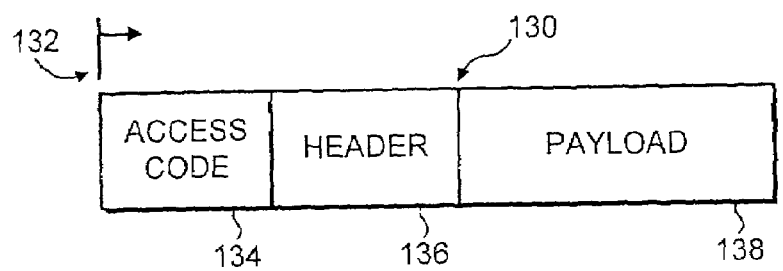
FIG. 6 illustrates a radio packet.

Referring to FIG. 6, a typical radio packet 130 is illustrated. The radio packet has a start 132 and contains three distinct portions: a first portion contains an Access Code 134, a second portion contains a Header 136 and a third portion contains a Payload 138.

The Access Code is a series of symbols used in the network to identify the start of a radio packet. It has a fixed length. In a normal communication mode, the master and slave units use the Master ID as the Access Code. As there is only one master unit in a network, the Master ID identifies the network.

The header 136 may or may not be present. If present, it has a fixed length. The header contains control words. The local address (L_ADDR) is a word uniquely identifying a slave within a network. The local address is assigned to a slave unit by the master unit when the master unit joins the slave to the network. The all zero L_ADDR is reserved for broadcast purposes. The packet identification word (PK_ID) specifies the features of the radio packet 130. PK_ID specifies whether a payload is present and its size and whether the payload contains data or transceiver control information.

The payload 38 carries either transceiver control information or voice/data information. The payload is of variable length and may be absent.

Figure 7:
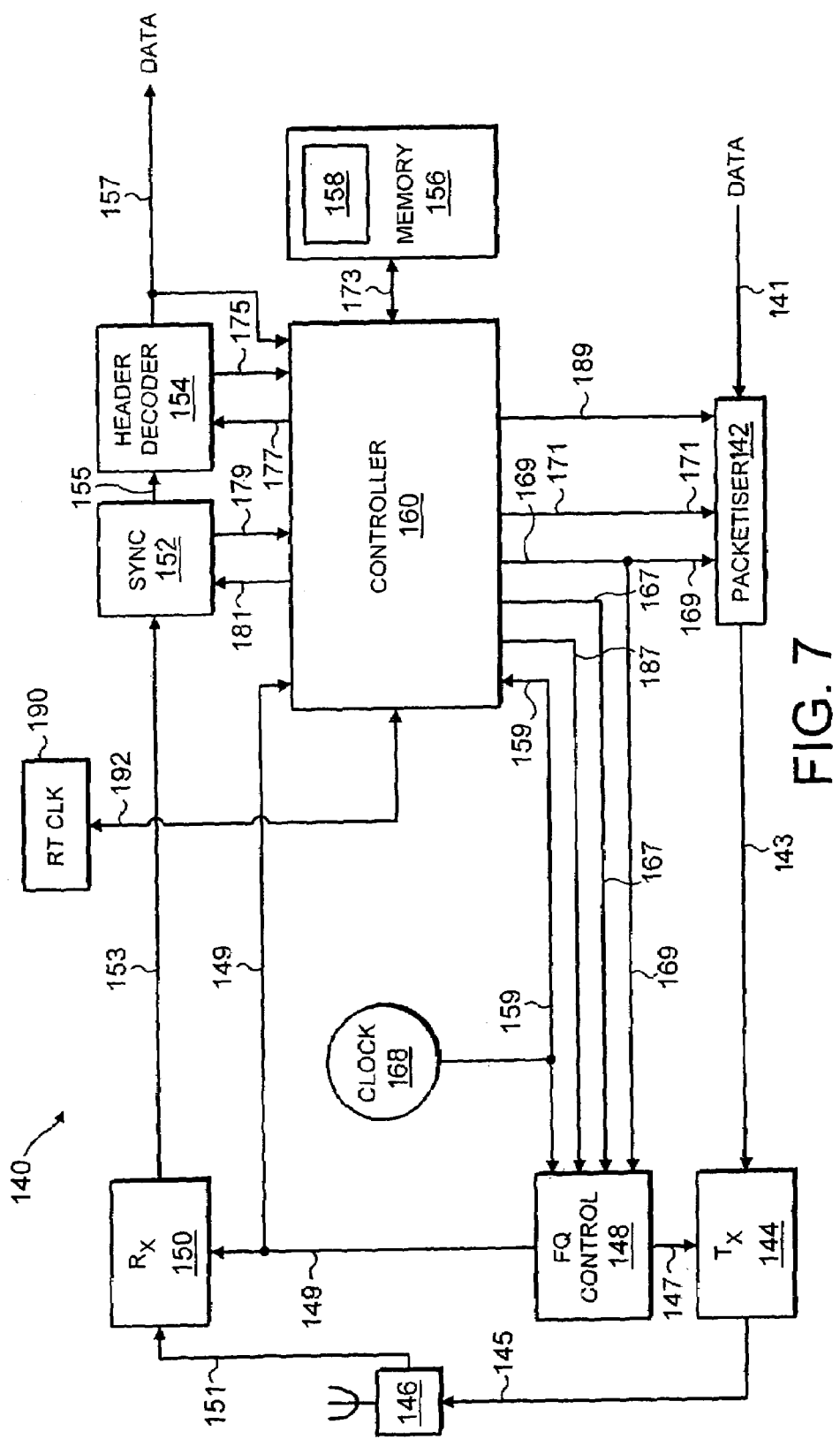
FIG. 7 illustrates a transceiver unit suitable for use as a master or slave.

Referring to FIG. 7, a schematic illustration of a transceiver unit is shown. Only as many functional blocks and interconnections are shown in this diagram as are necessary to explain in the following how a transceiver unit and the communication network operates. The transceiver unit 140 contains a number of functional elements including: an antenna 146, receiver 150, synchroniser 152, header decoder 154, controller 160, memory 156 having memory portion 158 storing the transceiver unit's Unit ID, packetiser 142, clock 168, frequency hop controller 148 and transmitter 144. Although these elements are shown as separate elements, they may, in fact, be integrated together and may be carried out in software or in hardware.

Data to be transmitted in the payload of a packet by the transceiver unit 140 is supplied as data signal 141 to the packetiser 142. Control information to be transmitted in the payload of a packet is supplied in a payload control signal 189 provided by the controller 160 to the packetiser 142. The packetiser 142 also receives an access code control signal 169 and a header control signal 171 from controller 160 which respectively control the Access Code 134 and the Header 136 attached to the payload to form the packet. The packetiser 142 places the data or control information into a packet 130 which is supplied as signal 143 to the transmitter 144. The transmitter 144 modulates a carrier wave in dependence upon the signal 143 to produce the transmitted signal 145 supplied to the antenna 146 for transmission. The frequency of the carrier wave is controlled to be one of a sequence of hop frequencies by a transmission frequency control signal 147 supplied by the frequency hop controller 148 to the transmitter 144.

The antenna 146 receives a radio signal 151 and supplies it to the receiver 150 which demodulates the radio signal 151 under the control of a reception frequency control signal 149 supplied by the frequency hopping controller 148 to produce a digital signal 153. The digital signal 153 is supplied to the synchroniser 152 which synchronises the transceiver unit 140 to the time frame of the network. The synchroniser is supplied with an access code signal 181 specifying the Access Code of the packet which the transceiver unit is expecting to receive. The synchroniser accepts those received radio packets with Access Codes which correspond to the expected Access Codes and rejects those received radio packets with Access Codes that do not correspond to the expected Access Code. A sliding correlation is used to identify the presence and the start of the expected Access Code in a radio packet. If the radio packet is accepted, then the radio packet is supplied to the header decoder 154 as signal 155 and a confirmation signal 179 is returned to the controller 160 indicating that the packet has been accepted by the synchroniser 152. The confirmation signal 179 is used by the controller in a slave unit to resynchronise the slave clock to the master clock. The controller compares the time at which a radio packet was received with the time at which the radio packet was expected to be received and shifts its timing to offset the difference. Such an offset may be achieved by varying the value of M_OFFSET stored in memory 156 by the value of the difference. The header decoder 154 decodes the header in the received packet and supplies it to the controller 160 as header signal 175. The header decoder 154, when enabled by a payload acceptance signal 177 supplied by the controller 160, produces a data output signal 157 containing the remainder of the radio packet, the payload 138. The controller responds to a zero value of L_ADDR in the header signal 175 to enable the header decoder. The data output signal 157 may contain transceiver control information. In this instance the data output signal 157 is supplied to controller 160 in response to the payload acceptance signal 177 provided by the controller 160.

The frequency-hopping controller 148 cycles through a sequence of frequencies. The transmission frequency control signal 147 and the reception frequency control signal 149 normally alternately control the transmitter 144 and the receiver 150. When the transceiver 140 is acting as a master, the receiver 150 is normally capable of receiving at frequencies determined by the odd values of the sequence and the transmitter is normally capable of transmitting at frequencies determined by the even values of the sequence. When the transceiver is acting as a slave unit the reverse is true. The frequency-hopping controller 148 receives the access code control signal 169 (also supplied to the packetiser 142) and an offset signal 167 from the controller 160 and a clock signal 159, which represents the time held in clock 168, from the clock 168. The offset signal 167 defines the value of an offset from the time held in the clock 168. This value may be null. The frequency-hopping controller combines the clock signal 159 and the offset signal 167 to emulate the time held in a clock offset by the value of the offset signal 167 from the clock 168. The sequence of frequencies through which the hopping controller 148 cycles is dependent upon the access code control signal 169. The position within the cycle is dependent upon the emulated time. When the access code control signal 169 provides the value MASTER ID, a master unit frequency-hopping sequence is defined. When the access code control signal 169 provides the value SLAVE ID, a slave unit frequency-hopping sequence is defined.

The memory 156 has a portion 158 which permanently stores the Unit ID of the transceiver unit 140. The remaining portion of the memory 156 can be written to by the controller 160. If the transceiver unit 140 is functioning as a slave unit, the memory 156 will additionally store the Master ID, a value M_OFFSET representing the difference between the slave unit's clock and the master unit's clock and the slave's address in the network, L_ADDR. If the transceiver unit 140 is functioning as a master unit, the memory 156 will additionally store for each slave unit participating in the network: the Slave ID; a value S_OFFSET representing the difference between the master unit's clock and that particular slave unit's clock and L_ADDR uniquely identifying the particular slave unit in the network.

It should be noted that the access code signal 181, the access code control signal 169 and the offset signal 167 in the communication mode remain the same for adjacent duplex time slots, and that the access code signal 181 and the access code control signal 169 will have the same values.

It will therefore be appreciated that when a master unit and Slave unit are in normal communication, the Slave unit emulates the Master unit's clock by combining the stored current value of M_OFFSET with the value of its own clock. The Master clock and emulated Master clock may both be referred to as the Bluetooth clock. The Bluetooth clock provides a synchronous time reference which is common to the Slave unit and Master Unit. The Bluetooth cock has no relation to the time of day and can be initialised at any value. It is used to provide the timing reference for the Bluetooth transceiver. The Bluetooth clock may be implemented as a free-running 28-bit counter that wraps around at $2^{28}-1$ at a regular rate of 3.2 kHz. The Bluetooth clock in normal communication is synchronous with the Master clock and is used to keep the Fast Frequency Hopping of the transceivers in the network in step.

Thus far, the transceiver described is known (see WO 00/18149, published 29 Mar. 2000).

The controller 160 has access 192 to a Real Time Clock 190. The Real Time Clock may be part of a separate application, in which case access 192 represents an interface between the application and the transceiver circuitry 140.

The common time reference 20 previously described with reference to FIGS. 2 and 3 is based upon the Bluetooth clock. The Bluetooth clock which is an existing accurate synchronised clock already used for FFH is reused as the common time reference 20. The Bluetooth clock is a synchronised clock which is shared amongst the devices participating a piconet. In the master unit, the Bluetooth clock is the unit's clock, whereas for each Slave unit, the Bluetooth clock is the unit's clock offset by a particular amount.

The synchronisation between the Bluetooth clocks is maintained by the synchroniser 152 to a bit level accuracy (1 microsecond). The synchroniser accepts those received radio packets with Access Codes which correspond to the expected Access Codes and rejects those received radio packets with Access Codes that do not correspond to the expected Access Code. A sliding correlation is used to identify the presence and the start of the expected Access Code in a radio packet and resynchronise or maintain synchronisation of the slave clock to the master clock. This maintains the common Bluetooth clock.

Figure 8:
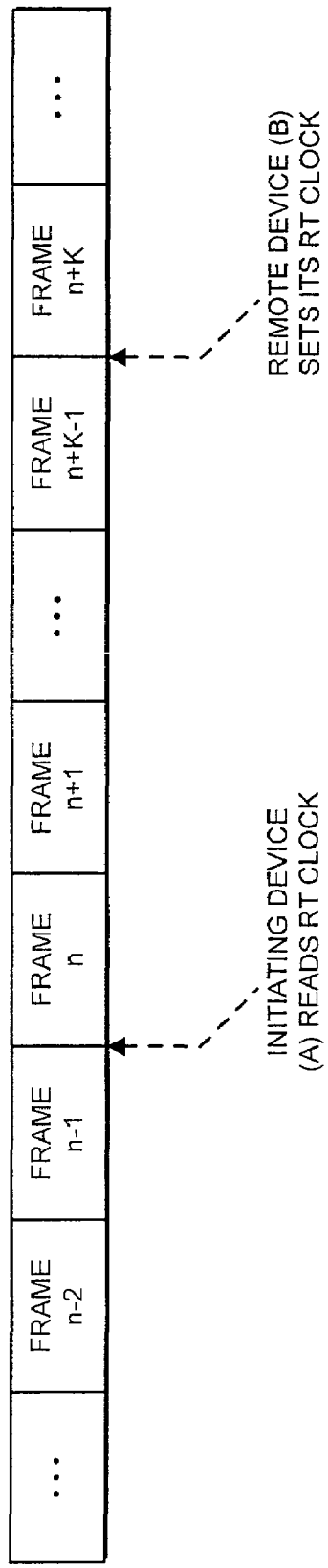
FIG. 8 illustrates the correspondence between common time reference and the Bluetooth clock.

An instance in the Bluetooth clock reference can be defined by the frame or slot number n and a trigger instant within a frame or slot. The frame number is specified by 26 bits and the slot number is specified by 27 bits. The trigger instant allows the precise timing of the instance to be identified and the frame/slot number allows the more general timing of the instance to be identified, that is, it allows one trigger instant to be differentiated from other trigger instants. The trigger instant can be pre-set as some fixed point within a slot/frame, in which case the frame/slot number n is sufficient to identify the instance and differentiate it from other instances. The preferred point for the trigger instant within the slot/frame is at the very beginning as illustrated in FIG. 8. The trigger instant may alternatively be one of many points within the slot/frame, in which case the frame/slot number is insufficient to identify and differentiate the instance. A trigger flag is also necessary to identify which of the many points within the slot/frame is to be used as a trigger. Consequently, if the trigger instant is pre-set, the index i or j' in the messages 22 and 24 respectively can be the appropriate slot/frame number. However, if the trigger instant is not pre-set, the index i or j' in the messages 22 and 24 respectively can be the combination of appropriate slot/frame number and trigger flag.

The messages 22 and 24 may be transmitted as a new form of Link Manager messages. Conventional Link Manager Messages are described in the Bluetooth specification and they are a particular form of transceiver control messages described above in relation to FIG. 7. According to the first embodiment described above, the payload of the Link Manager Message would contain {i, RT(i)}, that is an indication of a past Real Time value and an indication of the past instance at which it was valid. According to the second embodiment described above, the payload of the Link Manager Message would contain {j', RT(j')}, that is an indication of a future Real Time value and an indication of the future instance at which it will be valid.

The Real Time value transmitted in message 22 or 24 may have many different formats. If the format is predetermined or fixed no indication of the format type is needed. However, if the format may vary, a format flag may also need to be included within the message to identify the format of the Real Time value sent. One possible format for the Real Time value is the Network Time Protocol format referenced in the RTP/RTCP specification (RFC 1889).

The controller 160 is arranged to read and/or write to the RT clock 190 and it is provided with the clock signal 159 and the offset value which are added to make the Bluetooth clock.

The intervals of the Bluetooth clock are predetermined and fixed. The interval between the beginning of adjacent slots is 625 μs and the interval between the beginning of adjacent frames is 1.25 ms. An instance for the Bluetooth clock is, preferably, at the beginning of each frame.

When operating as a transmitter in accordance with the first embodiment, the controller 160 at an instance i in the Bluetooth clock reads the Real Time clock 190 and then controls the packetiser 142 to produce the message 22. The message 22 will have as its Access Code 134 the Master ID, a header 136 indicates that the packet contains transceiver control information and may identify the message as a particular type of Link Manager Message and the payload contains an indication of a past Real Time value and an indication of the past instance at which it was valid.

When operating as a transmitter in accordance with the second embodiment, the controller 160 at an instance i in the Bluetooth clock reads the Real Time clock 190. It then calculates the interval T between instance i and j' and controls the packetiser 42 to produce the message 22. The message 22 will have as its Access Code 134 the Master ID, a header 136 indicates that the packet contains transceiver control information and may identify the message as a particular type of Link Manager Message and the payload contains an indication of a future Real Time value and an indication of the future instance at which it will be valid.

When operating as a receiver in accordance with the first embodiment, the header decoder 154 provides the payload of the message 22 to the controller. The controller obtains the indication of the past instance i and the indication of past Real Time value RT(i). The controller then calculates the interval T between the past instance i and a future instance j, and determines the expected Real Time value RT at instance j. At the instance j, the expected Real Time value becomes the current Real Time value RT and may be written to RT clock 190.

When operating as a receiver in accordance with the second embodiment, the header decoder 154 provides the payload of the message 22 to the controller. The controller obtains the indication of the future instance j' and the indication of the future Real Time value RT'. At the instance j', the received Real Time value RT' becomes the current Real Time value RT and may be written to RT clock 190.

The invention when implemented in Bluetooth devices reuses the existing Link Level Synchronisation used for FFH. The transmission and reception of messages occur at instances of the Bluetooth clock. The receiver 2 illustrated in FIG. 1 may be a Bluetooth Master or Slave which remains active in low power mode. The Real Time clocks 4 and 10 are separate from the Bluetooth chip which has an interface for reading/writing a Real Time clock. The controller 160 is controllable through a command to initiate Real Time synchronisation with another device. The controller may access a Real Time clock synchronously with an instance of the Bluetooth Clock and then asynchronously communicate with other devices to cause them to synchronise to that Real Time clock. Alternatively, the controller of a receiver 6 may send a request message requesting that its local Real Time clock is resynchronised, in which case the controller of transmitter 2 may access a Real Time clock synchronously with an instance of the Bluetooth Clock and then communicate with the receiver 6 to cause it to synchronise to that Real Time clock. In either case, such communication is preferably in the next available time slot for transmission.

Although the transmission and reception of messages 22 and 24 have been dealt with separately, it should be appreciated that a transceiver may be able to read a RT clock value and send the messages to provide a Real Time clock value and/or receive the messages to acquire a current Real Time clock value.

Although first and second embodiments have been presented separately, it is envisioned that a receiver, transmitter or transceiver may operate in accordance with one or both of the embodiments and may be controlled to selectively operate in accordance with a particular embodiment.

Although the invention has been primarily described with reference to a point to point communication system, as shown in FIG. 1, it also finds application in a point to multi-point communication system where the messages 22, 24 are broadcast.

The invention claimed is:

1. A device comprising:
   a controller for reading a real time clock at an identified instance of a common time reference having distinguishable instances, wherein the device is arranged to synchronise to the common time reference; and
   a transmitter for transmitting, in a network comprising the device and at least one receiver, an identification of the real time clock value for a first instance and an identification of the first instance.

2. A device as claimed in claim 1, wherein the controller is arranged to calculate the real time clock value at the first instance by adding the time difference between the first instance and the identified instance to the real time clock value at the identified instance to obtain the real time clock value for the first instance.

3. A device as claimed in claim 1, wherein the first instance is in the past at the moment of transmission.

4. A device as claimed in claim 1, wherein the first instance is in the future at the moment of transmission.

5. A device as claimed in claim 1, wherein the identified instance and the first instance are one and the same.

6. A device as claimed in claim 1, further comprising a synchronisation controller for maintaining the common time reference.

7. A device as claimed in claim 1, arranged to communicate in accordance with the Bluetooth Standard, wherein Link Level synchronization provides the common time reference.

8. A device as claimed in claim 1, arranged to communicate in accordance with the Bluetooth Standard, wherein the identification of the real time clock value and the identification of the first instance are transmitted as a Link Manager Message.

9. A device as claimed in claim 1, arranged to communicate in accordance with the Bluetooth Standard, wherein the instances of the common time reference are synchronous with the frequency hopping of the network.

10. A device as claimed in claim 1, wherein the first instance is identified by using a frame/slot number.

11. A device as claimed in claim 10, wherein the occurrence of the instance within the identified slot/frame is predetermined.

12. A device as claimed in claim 10, wherein occurrence of the instance within the identified slot/frame is determined by the transmission of a message.

13. A device as claimed in claim 1, further comprising an interface for connection to a Real Time Clock or Real Time application.

14. A device as claimed in claim 1 arranged for asynchronous transmission of the identification of the real clock value and of the identification of the first instance.

15. A media device such as a speaker, microphone, screen, camera or computer comprising a device as claimed in claim 1.

16. A device comprising:
a receiver for receiving, in a network comprising at least the device and a transmitter, a transmitted identification of a real time clock value and an identification of a first instance of a common time reference having distinguishable instances, wherein the receiver is arranged to synchronise to the common time reference; and
a controller for determining a real time clock value, current at a second instance from the received identification of a real time clock value and the received identification of a first instance.

17. A device as claimed in claim 16, wherein the real time clock value is the received value, if necessary, corrected in accordance with the time difference between the first and second instances.

18. A device as claimed in claim 16, wherein the first instance is in the past at the moment of reception.

19. A device as claimed in claim 16, wherein the real time clock value determination is by calculation in which the time difference between the second and first instances is added to the received value of the real time clock.

20. A device as claimed in claim 16, wherein the first instance is in the future at the moment of reception.

21. A device as claimed in claim 16, wherein the controller determines that the current real time clock value is the received value when the second instance of the common time reference occurs, the second and first instances being one and the same.

22. A device as claimed in claim 16, further comprising a synchronisation controller for maintaining the common time reference.

23. A device as claimed in claim 22, wherein the synchronisation controller comprises correlation means for identifying access codes preceding the payload of data packets.

24. A device as claimed in claim 23, wherein the synchronisation to the common time reference is updated as each packet is received.

25. A device as claimed in claim 22, wherein the synchronization controller provides bit-level synchronisation of the common time reference.

26. A device as claimed in claim 16, arranged to communicate in accordance with the Bluetooth Standard, wherein Link Level synchronization provides the common time reference.

27. A device as claimed in claim 16, arranged to communicate in accordance with the Bluetooth Standard, wherein the identification of the real time clock value and the identification of the first instance are transmitted as a Link Manager Message.

28. A device as claimed in claim 16, arranged to communicate in accordance with the Bluetooth Standard, wherein the first instance is identified by using a frame/slot number.

29. A device as claimed in claim 28, wherein the occurrence of the instance within the identified slot/frame is predetermined.

30. A device as claimed in claim 28, wherein occurrence of the instance within the identified slot/frame is determined by the reception of a message.

31. A device as claimed in claim 16, further comprising an interface for connection to a Real Time Clock or Real Time application.

32. A device as claimed in claim 16 arranged for asynchronous transmission of the identification of the real clock value and of the identification of the first instance.

33. A media device such as a speaker, microphone, screen, camera or computer comprising a device as claimed in claim 16.

34. A method of providing real time clock information from a transmitter device to a receiver device, comprising:
synchronising the transmitter device to a common time reference having distinguishable instances shared in common, with the transmitter and receiver obtaining a real time clock value at an identified instance of the common time reference; and
transmitting an identification of the real time clock value for a first instance and an identification of the first instance.

35. A method of receiving real time clock information transmitted from a transmitter device to a receiver device, comprising:
synchronising the receiver device to a common time reference having distinguishable instances shared in common with the transmitter and receiver;
receiving a transmitted identification of a real time clock value and an identification of a first instance of the common time reference; and
determining a real time clock value current at a second instance of the common time reference, corresponding to the received real time clock value corrected in accordance with the time difference between the first and second instances, if any.

36. A device comprising:
a controller for obtaining a clock value at an identified instance of a common time reference having distinguishable instances, wherein the device is arranged to synchronise to the common time reference; and
a transmitter for transmitting, in a low power frequency hopping network comprising the device and at least one receiver, an identification of a first instance of the common time reference and an identification of a clock value that is valid at the first instance of the common reference.

37. A device comprising:
a receiver for receiving, in a low power frequency hopping network comprising at least the device and a transmitter, a transmitted identification of a clock value and an identification of a first instance of a common time reference having distinguishable instances, wherein the device is arranged to synchronise to the common time reference; and
a controller for determining a clock value, valid at a second instance of the common time reference, from the received identification of a clock value and the received identification of a first instance.

38. A method of providing clock information from a transmitter to a receiver in a low power frequency hopping network, the method comprising:
  synchronising the transmitter to a common time reference, having distinguishable instances, shared in common with the transmitter and receiver;
  obtaining a clock value at an identified instance of the common time reference; and
  transmitting an identification of a clock value that is valid at a first instance and an indication of the first instance.

39. A method of receiving clock information transmitted from a transmitter to a receiver in a low power frequency hopping network, the method comprising:
  synchronising the receiver to a common time reference, having distinguishable instances, shared in common with the transmitter and receiver;
  receiving a transmitted identification of a clock value that is valid at a first instance and an indication of the first instance; and
  determining a clock value, valid at a second instance of the common time reference, corresponding to the received clock value corrected in accordance with the time difference between the first and second instances, if any.

40. A method as claimed in claim 34, further comprising calculating the real time clock value at the first instance by adding the time difference between the first instance and the identified instance to the real time clock value at the identified instance to obtain the real time clock value for the first instance.

41. A method as claimed in claim 34, wherein the first instance is in the past at the moment of transmission.

42. A method as claimed in claim 34, wherein the first instance is in the future at the moment of transmission.

43. A method as claimed in claim 34, wherein the identified instance and the first instance are one and the same.

44. A method as claimed in claim 34, further comprising maintaining the common time reference using a synchronisation controller.

45. A method as claimed in claim 34, wherein the transmitter device is arranged to communicate in accordance with the Bluetooth Standard, wherein Link Level synchronization provides the common time reference.

46. A method as claimed in claim 34, wherein the transmitter device is arranged to communicate in accordance with the Bluetooth Standard, wherein the identification of the real time clock value and the identification of the first instance are transmitted as a Link Manager Message.

47. A method as claimed in claim 34, wherein the transmitter device is arranged to communicate in accordance with the Bluetooth Standard, wherein the instances of the common time reference are synchronous with the frequency hopping of the network.

48. A method as claimed in claim 34, wherein the first instance is identified by using a frame/slot number.

49. A method as claimed in claim 48, wherein the occurrence of the instance within the identified slot/frame is predetermined.

50. A method as claimed in claim 48, wherein occurrence of the instance within the identified slot/frame is determined by the transmission of a message.

51. A method as claimed in claim 34, further comprising connecting to a Real Time Clock or Real Time application using an interface.

52. A method as claimed in claim 34 wherein the transmitter device is arranged for asynchronous transmission of the identification of the real clock value and of the identification of the first instance.

53. A method as claimed in claim 35, wherein the real time clock value is the received value, if necessary, corrected in accordance with the time difference between the first and second instances.

54. A method as claimed in claim 35, wherein the first instance is in the past at the moment of reception.

55. A method as claimed in claim 35, wherein the real time clock value determination is by calculation in which the time difference between the second and first instances is added to the received value of the real time clock.

56. A method as claimed in claim 35, wherein the first instance is in the future at the moment of reception.

57. A method as claimed in claim 35, further comprising determining whether the current real time clock value is the received value when the second instance of the common time reference occurs, the second and first instances being one and the same.

58. A method as claimed in claim 35, further comprising maintaining the common time reference using a synchronisation controller.

59. A method as claimed in claim 58, further comprising identifying access codes preceding the payload of data packets.

60. A method as claimed in claim 59, wherein the synchronisation to the common time reference is updated as each packet is received.

61. A method as claimed in claim 58, wherein the synchronization controller provides bit-level synchronisation of the common time reference.

62. A method as claimed in claim 35, wherein the receiver device is arranged to communicate in accordance with the Bluetooth Standard, wherein Link Level synchronization provides the common time reference.

63. A method as claimed in claim 35, wherein the receiver device is arranged to communicate in accordance with the Bluetooth Standard, wherein the identification of the real time clock value and the identification of the first instance are transmitted as a Link Manager Message.

64. A method as claimed in claim 35, wherein the receiver device is arranged to communicate in accordance with the Bluetooth Standard, wherein the first instance is identified by using a frame/slot number.

65. A method as claimed in claim 64, wherein the occurrence of the instance within the identified slot/frame is predetermined.

66. A method as claimed in claim 64, wherein occurrence of the instance within the identified slot/frame is determined by the reception of a message.

67. A method as claimed in claim 35, further comprising connecting to a Real Time Clock or Real Time application using an interface.

68. A method as claimed in claim 35 wherein the receiver device is arranged for asynchronous transmission of the identification of the real clock value and of the identification of the first instance.

* * * * *